United States Patent
Paine et al.

[15] 3,673,440
[45] June 27, 1972

[54] UNINSULATED IN-CORE THERMIONIC DIODE

[72] Inventors: T. O. Paine, Deputy Administrator of the National Aeronautics and Space Administration with respect to an invention of; Jerry P. Davis, La Canada, Calif.

[22] Filed: Oct. 15, 1968

[21] Appl. No.: 767,741

[52] U.S. Cl. .................................................. 310/4
[51] Int. Cl. ........................................... H01j 45/00
[58] Field of Search ......................................... 310/4

[56] References Cited

UNITED STATES PATENTS

| | | | |
|---|---|---|---|
| 3,578,991 | 5/1971 | Gross | 310/4 |
| 3,509,386 | 4/1970 | Byrd | 310/4 |
| 2,530,907 | 11/1950 | Pack | 310/4 X |
| 3,002,116 | 9/1961 | Fisher | 310/4 |
| 3,093,567 | 6/1963 | Jablonski et al. | 310/4 X |
| 3,138,725 | 6/1964 | Houston | 310/4 |
| 3,139,542 | 6/1964 | Huber et al. | 310/4 |
| 3,322,979 | 5/1967 | Clendinning et al. | 310/4 |
| 3,439,193 | 4/1969 | Bensussan | 310/4 |
| 3,444,400 | 5/1969 | Janner et al. | 310/4 |

Primary Examiner—D. F. Duggan
Attorney—J. H. Warden, M. F. Mott and G. T. McCoy

[57] ABSTRACT

A thermionic energy converter is provided by a plurality of diodes externally heated by a reactor and externally connected in series-parallel arrangement. Each diode assembly comprising a tubular anode within a tubular cathode is located in the core of a nuclear reactor. Ceramic spacers and seals are located at the ends of the diode tubes outside the reactor core. A conductive coolant system is connected directly to the ends of the tubular anodes of a first group of diodes. A conductive bus connects the cathodes of the first group of diodes to complete a parallel arrangement. A second group of diodes in a similar parallel arrangement is connected in series with the first by a direct electrical connection from the bus of one group to the coolant system of the other. Each coolant system is independent of the others and is driven by a separate pumping device that preserves the electrical integrity of the diodes connected thereto.

5 Claims, 4 Drawing Figures

3,673,440

INVENTOR.
JERRY P. DAVIS

UNINSULATED IN-CORE THERMIONIC DIODE

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

This invention relates to thermionic energy converters, and particularly to reactor heated thermionic diodes suitable for use in series-parallel arrangements.

2. Description of the Prior Art

A thermionic diode is generally comprised of a cathode made of suitable emitter material having a relatively high bare work function, and an anode made of suitable collector material. A space between the anode and cathode is maintained and sealed in order that it be filled with a gas having a low ionization potential. The cathode is heated while the anode is cooled for efficient collection of thermionically emitted electrons.

Previously, reactor heated thermionic diode structures have been proposed. One problem has been in providing insulators between the anode and cathode for seals to contain cesium or other suitable interelectrode gas. Another problem has been in providing a coolant for the anode without violating its electrical integrity in such a manner that a plurality of such diodes in a reactor may be readily connected not only in parallel but also in series by connecting the cathodes of one parallel group to the anodes of another parallel group. A more serious problem has been in providing electrical isolation of the coolant, particularly since a reactor heated diode requires a liquid metal for the coolant. Other proposed designs require a ceramic insulator between the anode and coolant containment structures to maintain electrical isolation.

Radiation damage to ceramic insulators has indicated that potential cracking problems may occur in the expected range of integrated fast neutron fluxes. The dielectric strength of such cracked insulators may be degraded. At the present time, therefore, the question of insulator integrity is a significant and uncertain area of concern in reactor heated thermionic diodes. This uncertainty is circumvented by the present invention.

Although it is possible to conceive of a thermionic reactor design which eliminates all insulating materials between the anode and cathode from the core itself, and still permits series connection of diodes for a greater voltage output, it is another matter to conceive of a design which eliminates all insulating material from between the anode and the sheath or tube through which the coolant flows, particularly when a highly conductive coolant is used such as sodium or potassium in the liquid phase. The need for insulating material between the anode and coolant tube is obviated by the present invention.

SUMMARY OF THE INVENTION

The present invention is primarily directed to utilizing the coolant system of a reactor heated thermionic diode as a conductor for generated electrical current, thereby eliminating all insulating material from the heat exchanging surfaces of the anode. That is readily accomplished where the anode is a tube placed concentrically with a tubular cathode, for then the coolant may be circulated through the tubular anode in direct thermal contact therewith. A direct electrical connection is made to the cathode, as by a bus bar at each end which supports the entire diode assembly. The cathodes of other diodes are connected to the same bus bar while the anodes of such other diodes are connected to the same coolant system to provide a bank of diodes in parallel. Another similar bank may be connected in series with the first by connecting the cathode bus bar of one to the coolant system of the other.

More particularly, in accordance with a preferred embodiment of the invention, the reactor heated thermionic diode is externally fueled and the tubular anode is placed within the tubular cathode so that an insulated bus bar may be more readily connected to the cathode and the tubular anode may be provided as an integral part of the coolant tubing.

In accordance with a further feature of the invention, all insulating materials required between the anode and cathode are placed outside the heating zone. That is readily accomplished by employing concentric tubular anode and cathode electrodes of sufficient length to permit sealing the space therebetween at positions sufficiently far apart along the diode assembly axis to be able to place the heating element well within those positions. In the preferred embodiment, the heating is by fissionable material, such as uranium, contained in a cylindrical canister. A sufficient number of similar diodes are nested together to form the nuclear reactor in a manner well known to those skilled in the art. The heat produced by the nuclear reactions is thereby directly transferred to the cathode of a given diode while an electrically conductive coolant is circulated through the anode by an isoelectric system.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
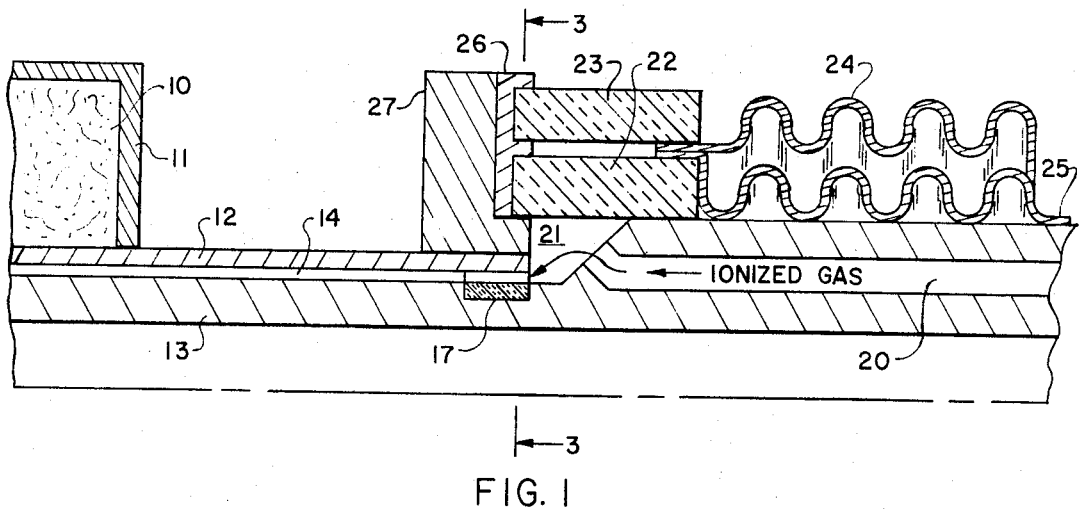
FIG. 1 shows a longitudinal sectional view of one quadrant of a thermionic diode constructed in accordance with the present invention.

Referring now to the drawings, particularly to FIG. 1, a thermionic diode constructed in accordance with the present invention comprises an annular core 10 of fissionable material with a casing 11 of suitable material and a tubular cathode 12 of suitable thermionic emitter material. Since the tubular cathode 12 and the casing 11 completely enclose the fissionable material, the two are made of the same or compatible material. For example both the casing 11 and the cathode 12 may be made of tungsten or other metal having a high bare thermionic work function and a high melting point.

Figure 2:
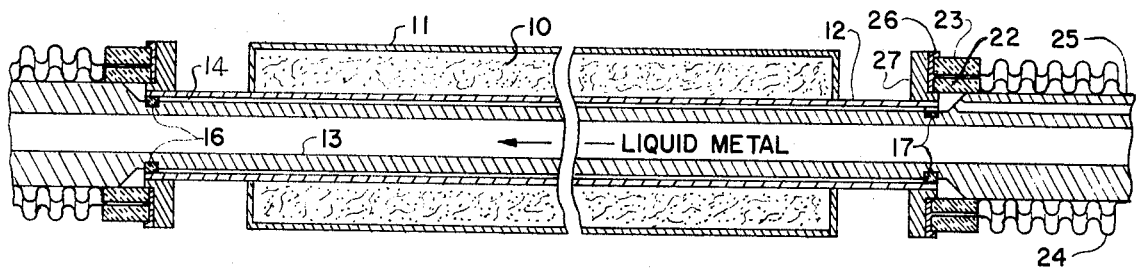
FIG. 2 shows a longitudinal sectional view of an entire thermionic diode constructed in accordance with the present invention as shown in FIG. 1.

A tubular anode 13 of a slightly smaller outside diameter than the inside diameter of the tubular cathode 12 is coaxially mounted within it, as may be more clearly seen in FIG. 2, to provide a small space 14 therebetween. Annular spacers 16 and 17 of suitable ceramic material, such as alumina, are provided at each end of the cathode 12 outside of the fueled region (fissionable material 10 in the casing 11). Each spacer seats in an annular slot in the tubular anode 13 as may be more clearly seen in FIG. 2 for the spacer 17.

Figure 3:
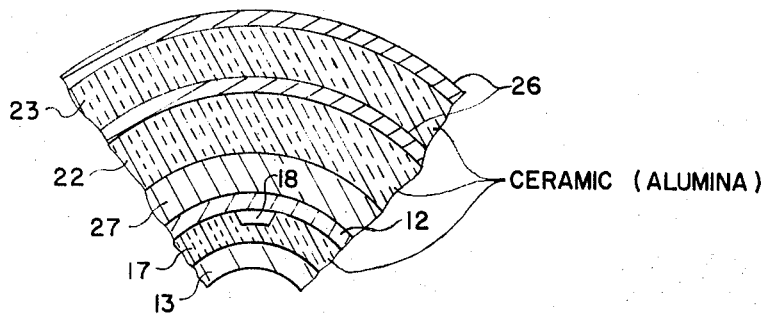
FIG. 3 shows a segment of cross sectional view taken on a line 3—3 of FIG. 1.

The spacer 17 is segmented and has a longitudinal slot 18, as shown in FIG. 3, to provide a passage for evacuating the space 14 and thereafter filling it with a suitable electron ionizable gas, such as cesium, as is the practice in most thermionic diode structures. A port 20 is provided along the wall of the anode 13 to communicate with an annular space 21 which is enclosed by an assembly comprising ceramic rings 22 and 23 and a double bellows 24. The end 25 of the latter is fixedly attached to the anode 13, as by welding or brazing, to provide a gas-tight junction therebetween. The other end is held securely between the ceramic rings 22 and 23, which are in turn held securely by attachment to metal ring 26. The latter is fixedly attached to a ring 27 which in turn is fixedly attached to the tubular cathode 12. In that manner, the space 21 through which a gas from the port 20 passes to the space 14 is provided with an expandable seal. A similar seal is provided at the other end of the anode-cathode assembly. Thus, both ends of the thermionic diode are sealed in such a manner that the cathode 12 may expand longitudinally more than the anode 13 as the latter is cooled while the former is heated.

In order to maintain electrical isolation of the cathode 12, the ceramic rings 22 and 23 are made of some high temperature insulating material, preferably alumina. Ring 27 is a metal compatible with the cathode 12. The anode 13 is a material having suitable thermionic compatibility with the cathode and suitable thermal compatibility with the liquid metal coolant, such as niobium. Rings 26 and 27 are also preferably made of niobium. In that manner, the seals 22 and 23 are outside the fast neutron flux zone of the reactor.

As noted hereinbefore, the present invention is primarily directed to obviating the need for insulating material between the anode and the coolant. The coolant system of the thermionic diode may then be employed as a conductor for generated electrical current. That is accomplished by connecting a coolant system to the tubular anodes of a group of diodes, such as the diode 30 of FIG. 4, and allowing the coolant to flow through the anodes thereof, such as anode 31, in direct contact therewith. The coolant system comprises a radiator 32 and a pump 33 capable of being driven without any electrically conductive path connecting it to any other conductor such as an electromagnetic pump, i.e., a pump which employs only an electromagnetic force to circulate coolant through the system. The pump 33 is connected to a manifold 34 which provides all diodes in parallel with coolant through tubes, such as tubes 35 and 36 for diode 30. A return manifold 37 couples all of the diodes to the radiator 32.

The coolant is preferably a metal in a liquid phase, such as sodium, potassium, lithium, and the like, as well as alloys thereof, so that the coolant itself constitutes a conductor of electricity. To complete the parallel arrangement of the diodes, all of the cathodes, such as the cathode 39 of diode 30, are electrically connected to a common junction 38. That may be readily accomplished by welding together rings 27 of adjacent diodes of a paralleled group. The welded rings then constitute bus bars at both ends of the diodes. Such bus bars may then be relied upon to support the diodes. The reactor cores and coolant system of a group of paralleled diodes are thereby basically hung from the secured tubular cathodes. The cathode bus bars would in turn be secured to a supporting frame (not shown) with proper electrical insulators. Since temperatures are relatively low outside the nuclear reactor cores and space is not a problem, substantial electrical insulators could be employed between the parallel connected diodes and the supporting frame.

Figure 4:
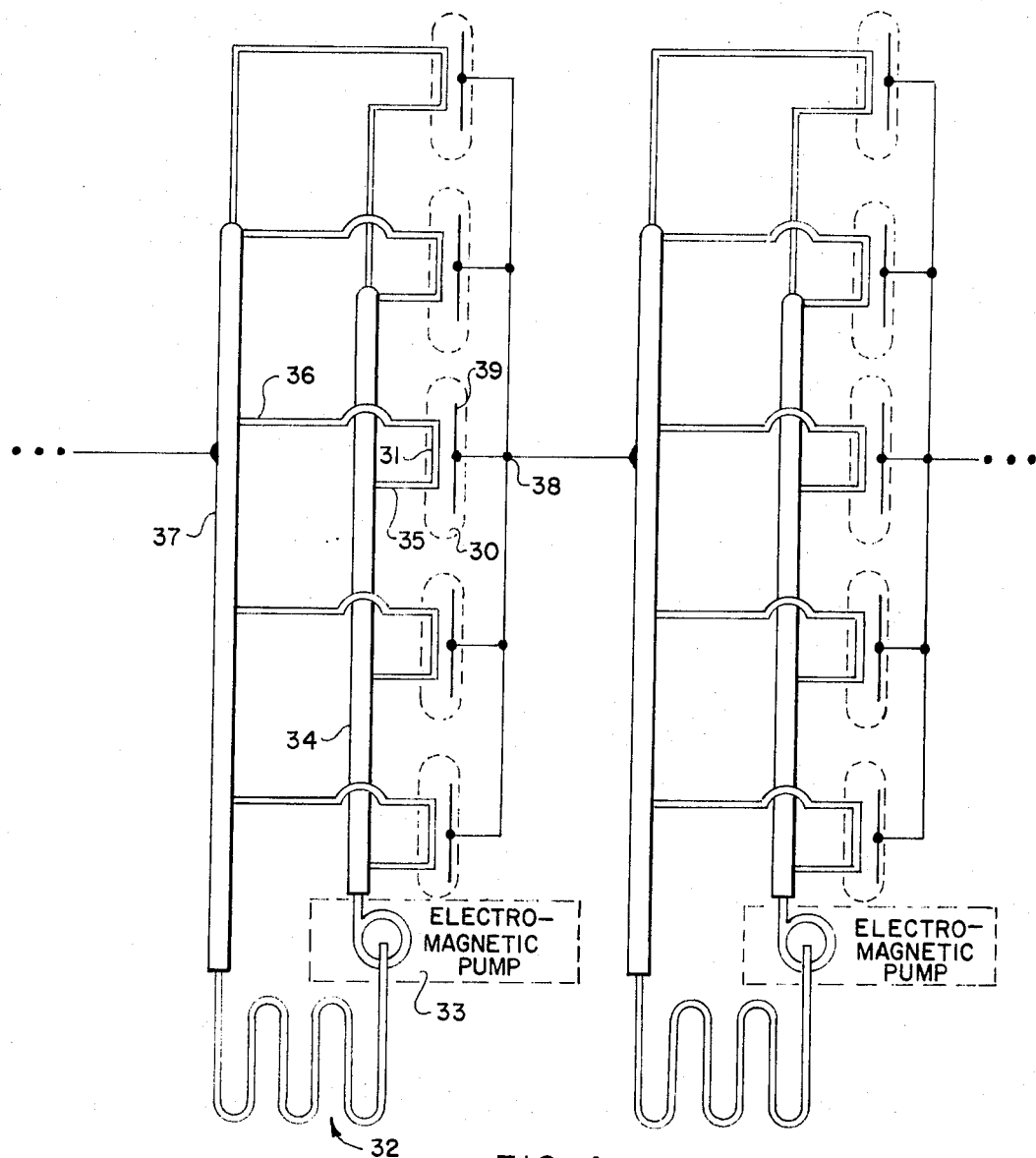
FIG. 4 illustrates schematically the manner in which a plurality of thermionic diodes constructed as shown in FIG. 1 are employed in a series-parallel arrangement in accordance with the present invention.

From the foregoing description of the present invention, it may be seen that many advantages are provided. A principal advantage is that the coolant system need not be electrically isolated from the anodes of paralleled diodes, thereby eliminating difficulties encountered in the prior art with insulator breakdown between the anode and the coolant. Another advantage is that the anode and cathode of each diode extend outside the core of fissionable material in order that series-parallel connections may be readily provided. To connect one parallel group in series with another, the coolant system of one is electrically connected to a common cathode junction of the other as shown in FIG. 4. Other advantages will be apparent to those skilled in the art.

Although a preferred embodiment of the present invention has been described in detail, it is to be understood that various modifications and substitutions of materials can be made without departing from the invention, particularly as the technology of materials progresses. For instance, a suitable non-conductive coolant may be developed, but the various advantages of the present invention may still be achieved through the conductive tubing of the coolant system. In that event, it may become desirable to electrically isolate the pump from the tubing, as by a short section of tubing on each side thereof made of non-conductive material.

What is claimed is:

1. A thermionic energy converter having a plurality of diodes externally heated and connected in series with at least one other diode, each diode having: a tubular cathode surrounding a tubular anode, and an annular space therebetween filled with ionizable gas; a pair of spacers, one at each end of said cathode filling a part of said space to maintain said cathode concentric with said anode, each of said spacers being made of ceramic material having high resistance to conduction of electricity; means disposed along said cathode for heating said cathode; means for sealing said annular space at each end of said cathode, said means including electrical insulating material to isolate said cathode from said anode; electrically isolated, conductive cooling means including a recirculating coolant passing through said anode in direct contact with said anode; said cathode of said one diode in said series being connected to said anode of said other diode by a direct electrical connection from said cathode of said one diode to said conductive cooling means of said other diode.

2. A combination as defined in claim 1 wherein each of said one and said other diodes is connected in parallel with a separate plurality of like diodes, each of said separate plurality of like diodes sharing a separate connective cooling means recirculating a common coolant through said anodes, thereby connecting anodes of all said plurality of diodes together through said conductive cooling means; and electrically conductive means for connecting said cathodes of all of said parallel connected diodes including said one diode to said conductive cooling means of said parallel connected diodes including said other diode for a series connection between two parallel-connected groups of diodes.

3. A combination as defined in claim 2 wherein said coolant consists of a liquid having low resistance to conduction of electricity.

4. A combination as defined in claim 3 wherein said means for sealing said annular space at each end of said cathode in each diode is comprised of at least one annular ring at each end of said cathode, each ring being made of ceramic material having high resistance to conduction of electricity, and being fixedly attached to said cathode in a gas-tight manner, and at least one annular bellows at each end of said cathode, each bellows having one end attached to said annular ring in a gas-tight manner and the other end attached to said anode in a gas-tight manner, and wherein said heating means is disposed along said cathode between ends thereof.

5. A combination as defined in claim 4 wherein said heating means is comprised of a nuclear reactor including nuclear fuel closely surrounding said cathode between ends thereof.

* * * * *